United States Patent [19]
Ikezawa et al.

[11] Patent Number: 5,708,501
[45] Date of Patent: Jan. 13, 1998

[54] LENS BEARER AND LENSOMETER INCORPORATING THE SAME

[75] Inventors: Yukio Ikezawa; Takashi Takahashi, both of Tokyo, Japan

[73] Assignee: Kabushiki Kaisha Topcon, Tokyo, Japan

[21] Appl. No.: 739,060

[22] Filed: Oct. 28, 1996

Related U.S. Application Data

[63] Continuation of Ser. No. 428,320, Apr. 25, 1995, abandoned.

[30] Foreign Application Priority Data

Apr. 28, 1994 [JP] Japan .................................. 6-092582

[51] Int. Cl.[6] .................................................. G01B 9/00
[52] U.S. Cl. ........................................ 356/124; 356/244
[58] Field of Search ................................ 356/124–127, 356/244, 246; 359/819, 827

[56] References Cited

U.S. PATENT DOCUMENTS

| | | | |
|---|---|---|---|
| 2,042,565 | 6/1936 | Tillyer | 356/127 |
| 2,604,697 | 7/1952 | Aulin | 356/127 |
| 3,494,700 | 2/1970 | Wilms | 356/124 |
| 3,858,982 | 1/1975 | Meckler | 356/127 |
| 4,232,966 | 11/1980 | Schpak et al. | 356/124 |
| 4,549,081 | 10/1985 | Ace | 356/124 |
| 5,173,739 | 12/1992 | Kurachi et al. | 356/127 |
| 5,280,336 | 1/1994 | Fantone | 356/124 |

*Primary Examiner*—Hoa Q. Pham
*Attorney, Agent, or Firm*—Armstrong, Westerman, Hattori, McLeland & Naughton

[57] ABSTRACT

The invention provides a lens bearer for bearing thereon a lens to be checked for an optical performance thereof. The lens bearer has a lens bearer body for bearing the lens thereon, and a covering member for being removably fitted on a lens-bearing portion of the lens bearer body, for placing the lens thereon. The covering member is made of a material which is softer than the lens bearer body. This makes it possible to replace the covering member alone when the lens bearer is used many times, thereby preventing deformation of a portion of the lens bearer which is brought into contact with lenses, and protecting the surface of the lens from being damaged.

5 Claims, 3 Drawing Sheets

LENS BEARER AND LENSOMETER INCORPORATING THE SAME

This application is a continuation of Ser. No. 08/428,320 filed Apr. 25, 1995, now abandoned.

BACKGROUND OF THE INVENTION

1. Field of the Invention

This invention relates to a lens bearer for bearing lenses to be checked, such as eyeglass lenses and contact lenses, thereon, and a lensometer incorporating the lens bearer.

2. Description of the Prior Art

In general, a lensometer which measures optical performance of a lens to be checked has a lens bearer arranged in a measuring optical system thereof for bearing the lens to be checked thereon, whereby a measuring light is transmitted through the lens to thereby determine the optical performance of the lens, which is dependent e.g. on the curvature of a spherical surface or the curvature of a cylindrical surface.

Recently, lenses to be checked are provided with various kinds of coating, and hence some of them have a surface with a low hardness. When such a lens with a low hardness is placed for measurement on a lens bearer made of a material having a hardness larger than that of the lens, the surface of the lens can be damaged. Therefore, it is preferred that the lens bearer is formed of a soft material, from the viewpoint of protection of surfaces of lenses to be checked.

On the other hand, assuming that the lens bearer is formed of such a soft material, when a large number of lenses are each checked for the optical performance thereof in a state of each of them having been brought into contact with the lens bearer, the lens bearer are worn by such repeated contact with lenses, resulting in a distortion of a shape thereof. This changes the level of lenses placed on the lens bearer and displaces them out of a proper position, causing errors in measurement of the optical performance thereof. Further, some of various kinds of lenses have a high hardness, and for this reason as well it has been undesirable to use a lens bearer having a low hardness.

SUMMARY OF THE INVENTION

It is a first object of the invention to provide a lens bearer which has a lens bearer body made of a hard material but is capable of protecting a surface of a lens to be checked from being damaged when placed thereon, thereby preventing occurrence of an error in measurement of the optical performance of the lens.

It is a second object of the invention to provide a lensometer which is capable of preventing a lens from being damaged when the lens is checked for the optical performance thereof.

To attain the first object, according to a first aspect of the invention, there is provided a lens bearer on which a lens is placed for checking optical performance thereof, comprising:

a lens bearer body having a lens-bearing portion for bearing the lens thereon, and a covering member which is removably fitted on the lens-bearing portion of the lens bearer body, the covering member being formed of a material which is softer than the lens bearer body.

The lens bearer of the invention is capable of protecting the lens to checked from being damaged when it is placed on the lens bearer, by virtue of the soft material of the covering member.

Preferably, the covering member is made of a material which is softer and has a lower friction coefficient than the lens bearer body.

According to this preferred embodiment, the protection of the lens is realized in a more reliable manner, since the material of the covering member is made of a material which is softer and has a lower friction coefficient than the lens bearer body.

Preferably, the covering member has a shape which covers at least an upper end surface of the lens bearer body.

According to this preferred embodiment, since the covering member has a shape which covers at least an upper end surface of the lens bearer body, it is possible to protect the upper end and the side of the lens bearer body as well.

To attain the second object, according to a second aspect of the invention, there is provided a lensometer including a lens bearer body having a lens-bearing portion for bearing a lens to be checked thereon, a measuring optical system for causing a measuring light to be transmitted therethrough, and control means for converting light measured by the measuring optical system into an electric signal, and directing processing of computation on the electric signal.

The lensometer according to the second aspect of the invention is characterized by comprising a covering member for being removably fitted on the lens bearer body, the covering member being made of a material which is softer than the lens bearer body.

According to the lensometer of the invention, it is possible to protect the lens to be checked from being damaged when the optical performance thereof is measured, since the covering member, which is removably fitted on the lens bearer body, is made of a material which is softer than the lens bearer body.

Preferably, the control means includes correction means for correcting a measurement obtained on the lens, depending on whether the lens is placed at a level assumed when the covering member is fitted on the lens bearer body, or at a level assumed when the covering member is not fitted on the lens bearer body.

According to this preferred embodiment, the correction means is capable of preventing occurrence of an error in measurement of the optical performance of the lens.

The above and other objects, features, and advantages of the invention will become more apparent from the following detailed description taken in conjunction with the accompanying drawings.

DESCRIPTION OF THE PREFERRED EMBODIMENTS

The invention will now be described in detail with reference to drawings showing an embodiment thereof.

Figure 1:
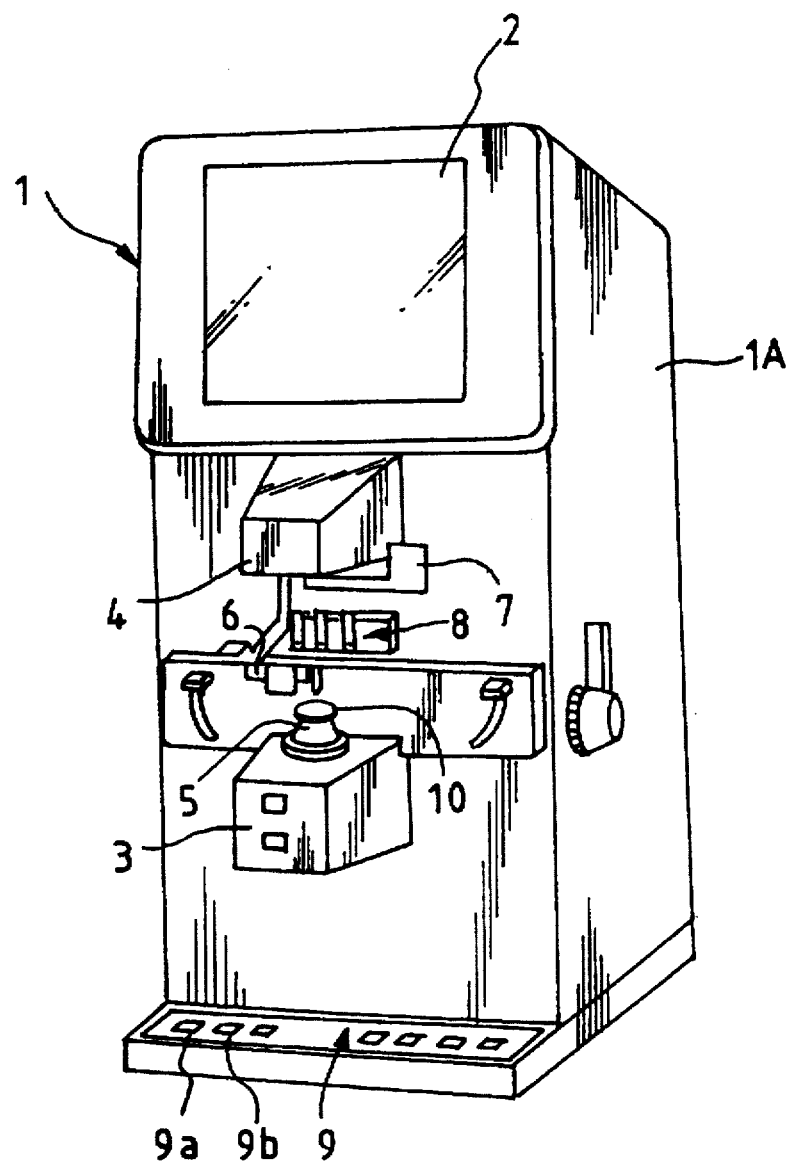
FIG. 1 is a perspective view showing a lensometer according to an embodiment of the invention.

Referring first to FIG. 1, there is shown a lensometer 1, which is comprised of a body 1A having an external shape of a box, display means 2, such as a CRT display, arranged in an upper front of the body 1A, an upper support box 4 and a lower support box 3 both arranged below the display means 2 in a manner facing toward each other with a predetermined interval to contain a measuring optical system therein. A lens bearer 5 according to the embodiment of the invention is arranged on a top of the lower support box 3.

The lensometer 1 further includes a lens retainer 6 for retaining a lens 10 to be checked by an upper surface of the lens 10, and a point marker 8 for providing a predetermined point mark on the lens 10 through operation of a lever 7.

Further, at the bottom of the front of the body 1A, there is provided input means 9 which includes mode-setting keys 9a, 9b for setting a measuring mode of the lensometer 1. The mode-setting key 9a sets "Mode 1", while the mode-setting key 9b sets "Mode 2", as will be described hereinafter.

Figure 2:
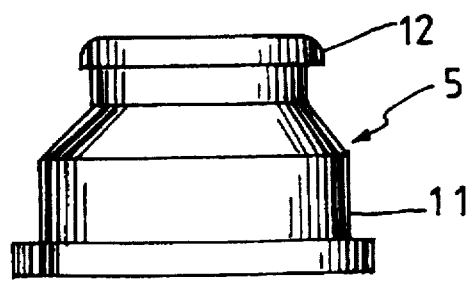
FIG. 2 is a front view showing a lens bearer appearing in FIG. 1.

Now, the lens bearer 5 will be described in detail with reference to FIG. 2 to FIG. 4.

The lens bearer 5 is comprised of a lens bearer body 11 substantially in the form of a hollow cylinder, which is interposed in an optical path L of the measuring optical system, and a covering member 12 in an annular form, which is made of a soft materializing a low friction coefficient for being removably fitted on an annular lens-bearing portion 11a of the lens bearer body 11, causing a change in the level of the lens 10 when the covering member 12 is fitted on the lens-bearing portion 11a of the lens bearer body 11.

The covering member 12 has a lower surface thereof formed with an annular recess 12a for receiving the lens-bearing portion 11a of the lens bearer body 11 to a predetermined depth, and an upper surface thereof serving as an annular bearer portion 12b for placing the lens 10 thereon.

The covering member 12 is formed of a thermoplastic resin, such as fluorine plastic and a heat-shrinkable tubing. More specifically, it is formed of a tetrafluoroethylene/perchloroalkylvinylether copolymer (product name: Teflon), a tetrafluoroethylene/hexafluoropropylne copolymer (product names: Teflon, Neoflon).

The use of such a material makes it possible not only to use a molded piece as the covering member 12, but also to easily shape the covering member 12 as desired by the use of a high-temperature dryer or a soldering iron without forming it with an expensive mold.

Figure 5:
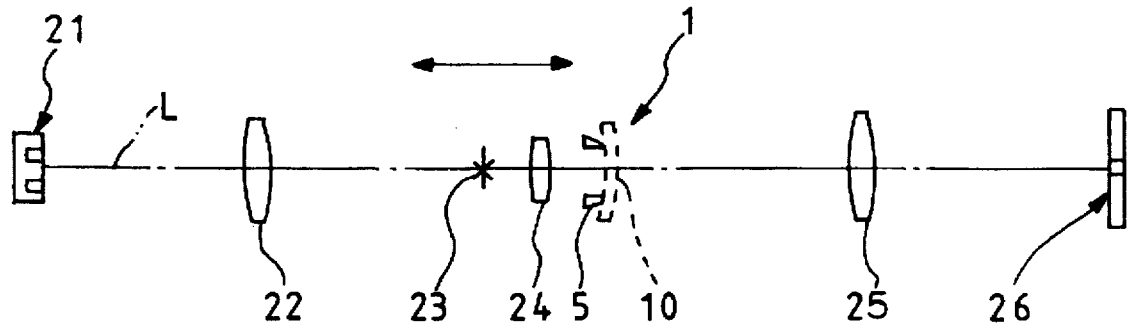
FIG. 5 is a diagram schematically showing the arrangement of a measuring optical system of the lensometer according to the embodiment.

FIG. 5 shows the measuring optical system of the lensometer 1.

The measuring optical system is comprised of a light source 21 formed of an LED for emitting a measuring ray of light along a measuring optical axis L of the lensometer 1, as well as an objective lens 22, a target 23, a collimator lens 24, the aforementioned lens bearer 5, an image-forming lens 25, and a photoelectric device 26, such as a CCD, all arranged along the measuring optical axis L in the mentioned order.

Figure 6:
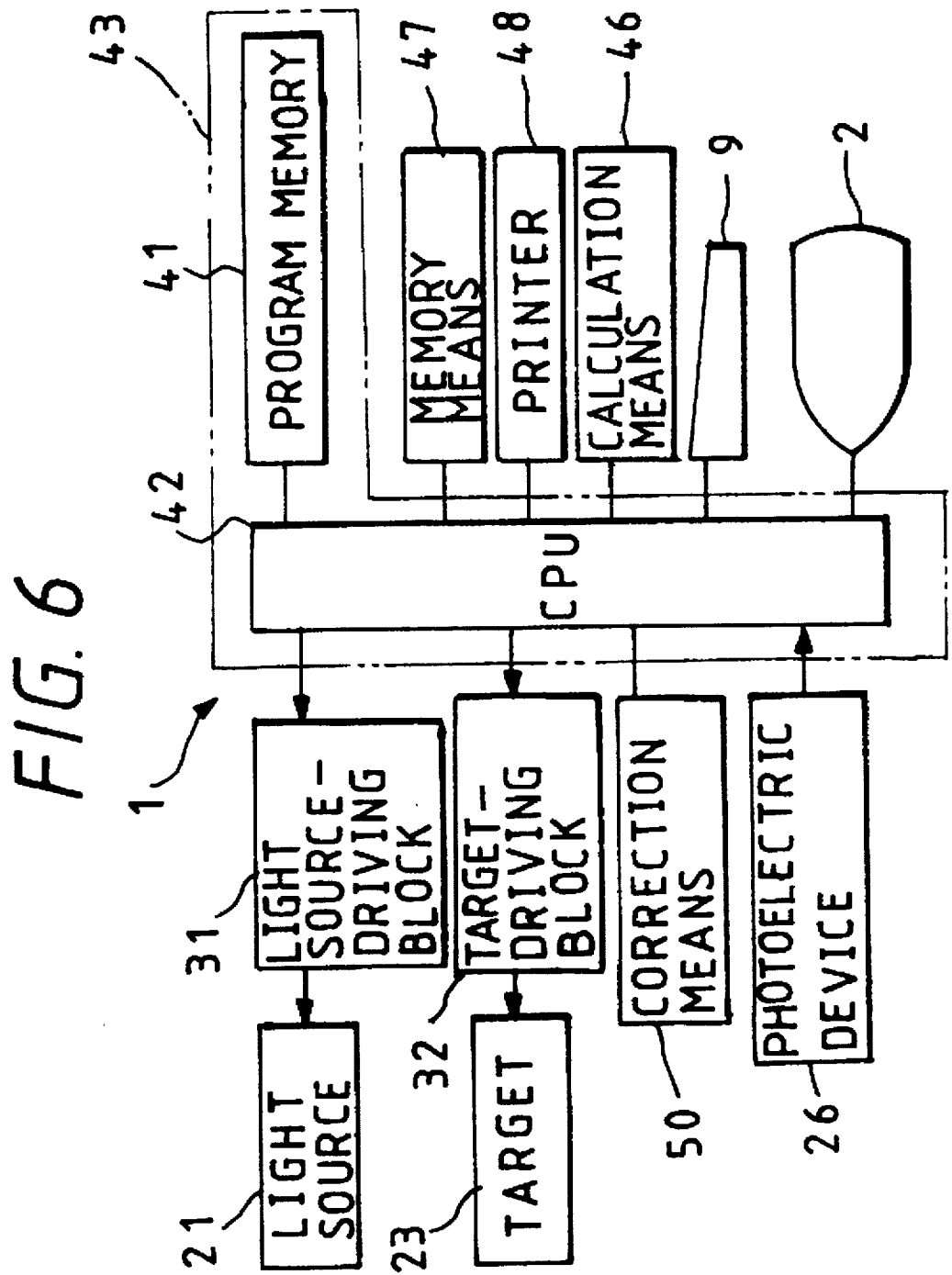
FIG. 6 is a block diagram showing the arrangement of a control system of the lensometer.

Next, a control system of the lensometer 1 will be described with reference to FIG. 6.

The control system of the lensometer 1 includes control means 43 comprised of a program memory 41 storing a control program and a CPU 42. Connected to the CPU 42 are a light source-driving block 31 for driving the light source 21, a target-driving block 32 for driving the target 23, and the photoelectric device 26.

Figure 3:
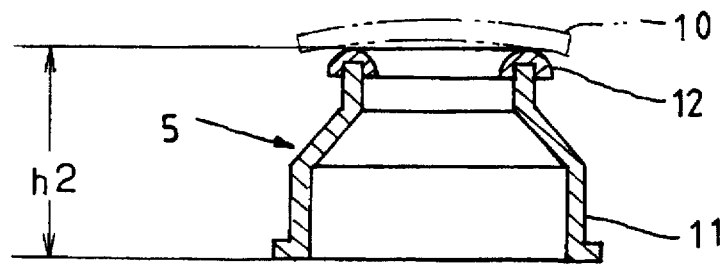
FIG. 3 is a cross-sectional view showing the lens bearer, with a covering member thereof being fitted thereon.
Figure 4:
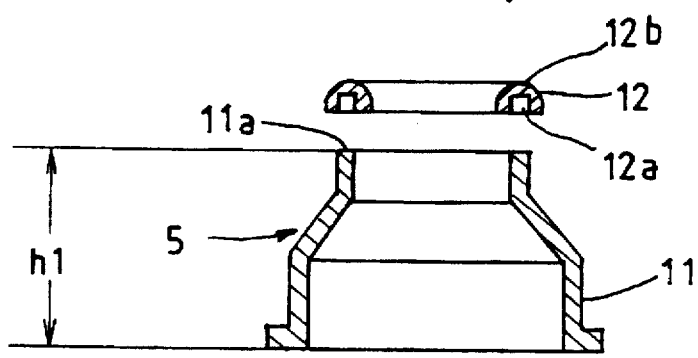
FIG. 4 is a cross-sectional view showing the lens bearer, with the covering member thereof being removed therefrom.

Also connected to the CPU 42 are calculation means 46 for calculating a refractive index of the lens 10 based on a photoelectric signal delivered from the photoelectric device 26, which is dependent on the wavelength of light emitted from the light source 21, memory means 47 for storing results of calculation of the calculation means 46, the aforementioned display means 2, the input means 9, a printer 48 for printing out results of calculation of the calculation means 46 and various kinds of messages, and correction means 50 for correcting a measurement of the refractive index of the lens 10 as results of calculation of the calculation means 46 based on the photoelectric signal obtained from the measuring optical system when the lens 10 is checked for the refractive index in a state of the lensometer in which the covering member 12 is fitted on the lens-bearing portion 11a of the lens bearer body 11, according to a change in the level of the lens 10 from a value h1 thereof assumed when the covering member 12 is not fitted as shown in FIG. 4 to a value h2 of the same assumed when the covering member 12 is fitted as shown in FIG. 3.

Next, the operation of the lensometer constructed as above will be described mainly on a case involving a change or a rise in the level of the lens 10 on the lens bearer 5.

Under the control of the CPU 42, the light source 21 is flickered by the light source-driving block 31, whereby a measuring ray of light is transmitted through the lens 10 to be checked which is placed on the lens bearer 5, thereby undergoing refraction in dependence on the refractive index of the lens 10. The image-forming lens 25 causes the resulting measuring ray of light to form an image on a light-sensitive surface of the photoelectric device 26 at a location dependent on the refractive index of the lens 10.

Then, the photoelectric device 26 delivers a photoelectric signal dependent on the refractive index of the lens 10 to the CPU 22.

The calculation means 26 receives the photoelectric signal dependent on the refractive index of the lens 10 under the control of the CPU 22, and calculates the curvature D of a spherical surface of the lens 10, etc.

Thus, the curvature D of the spherical surface of the lens 10 can be determined. However, when the covering member 12 is fitted on the lens bearer 5, the level of a top surface of the lens bearer 5 on which the lens 10 is placed is changed from the value h1, which is assumed when the covering member 12 is not fitted, to the value h2, so that unless a measurement of the curvature D calculated by means of the measuring optical system and the calculation means 26 is corrected to compensate for the change in the level of the top surface of the lens bearer and hence the level of the lens, there results an error corresponding to the thickness dt {=(h2−h1)} of the covering member 12.

Therefore, in the present embodiment, the correction means 50 corrects the error resulting from the fitting of the covering member 12 on the lens bearer body 11.

That is, when the lens 10 is checked in the state of the covering member 12 being fitted on the lens bearer body 11, the mode-setting key 9a is operated to set "Mode 1" (suitable for the state of the covering member 12 being fitted on the lens bearer body 11), whereby when the curvature D of the lens 10 is obtained by the use of the measuring optical system and the calculation means 26, the correction means 50 carries out the calculating operation of $dD = D2 \times dt/1000$ to obtain a correction amount dD. For example, assuming that the curvature D determined via the measuring optical system and the calculation means 26 is equal to 10 diopter, and dt is equal to 0.2 mm, the correction amount dD is equal to 0.02 diopter.

When the lens 10 is checked for the optical performance thereof without the covering member 12 being fitted on the lens bearer 5, it is only required to set "Mode 2" suitable for this condition by the mode-setting key 9b. In this case, the correction means 50 does not carry out error correction.

As described heretofore, the lensometer 1 has the lens bearer 5 comprised of the lens bearer body 11 which is interposed in the optical path L of the measuring optical system, and the covering member 12, which is made of a soft material having a low friction coefficient for being removably fitted on the lens-bearing portion 11a of the lens bearer body 11 for the lens 10 to be placed on the top surface thereof at a level different from the surface of a bear top or lens-bearing portion 11a of the lens bearer body 11. Therefore, the covering member 12 alone can be replaced as an expendable by a new article when the covering member 12 has been used many times, which makes it possible to avoid the inconvenience of deformation of a portion (the annular bearer portion 12b) of the lens bearer 5 which is brought into contact with lenses, as well as to protect the lens coating provided on the surfaces of the lens 10 since each of the lenses 10 and the annular bearer portion 12b are brought into contact with each other softly and with a small friction.

Further, the correction means 50 corrects results of measurement of the optical performance of the lens 10 carried out via the measuring optical system in the state of the covering member 12 being fitted on the lens-bearing portion 11a of the lens bearer body 11, according to the resulting change in the level of the lens 10, which makes it possible to correct an error in the measurement resulting from the use of the covering member 12.

Further, by forming the covering member 12 from a thermoplastic resin, terrestrial environments are prevented from being adversely affected, even when the covering members 12 are burnt as expendables.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A lens bearer on which a lens is placed for checking optical performance thereof, comprising:

a lens bearer body having a lens-bearing portion for bearing said lens thereon, and a coveting member which is removably fitted on said lens-bearing portion of said lens bearer body, said covering member being formed of a material which is softer and has a lower friction coefficient than said lens bearer body.

2. A lens bearer according to claim 1, wherein said covering member has a shape which covers at least an upper end surface of said lens bearer body.

3. A lensometer comprising:

a lens bearer body having a lens-bearing portion for bearing a lens to be checked thereon, a measuring optical system for causing a measuring light to be transmitted therethrough, control means for converting light measured by said measuring optical system into an electric signal, and directing processing of said electric signal, and a covering member for being removably fitted on said lens bearer body, said covering member being made of a material which is softer than said lens bearer body, wherein said control means includes means for obtaining an optical performance on said lens in accordance with a placing level of said lens assumed when said covering member is fitted on said lens bearer body.

4. The lensometer of claim 3 wherein said control means includes correction means for correcting a measurement obtained on said lens, depending on whether said lens is placed at a level assumed when said covering member is fitted on said lens bearer body, or at a level assumed when said covering member is not fitted on said lens bearer body.

5. The lensometer of claim 3 wherein said covering member fits into an upper end surface of said lens bearer body.

* * * * *